United States Patent [19]

Mussinan et al.

[11] 4,139,649
[45] Feb. 13, 1979

[54] FLAVORING WITH A MIXTURE OF 4-TERPINENOL PROPIONATE AND 2-METHYL-3-FURANTHIOL

[75] Inventors: Cynthia J. Mussinan, Bricktown; Manfred H. Vock, Locust; Arthur L. Liberman, Highlands, all of N.J.

[73] Assignee: International Flavors & Fragrances Inc., New York, N.Y.

[21] Appl. No.: 884,348

[22] Filed: Mar. 7, 1978

[51] Int. Cl.² .............................................. A23L 1/231
[52] U.S. Cl. ................................... 426/533; 426/535; 426/538
[58] Field of Search ....................... 426/533, 535, 538

[56] References Cited

U.S. PATENT DOCUMENTS 3,666,495 5/1972 Evers et al. ........................ 426/535

OTHER PUBLICATIONS

Arctander, Perfume and Flavor Chemicals, vol. II, Publ. by the author: Montclair, N.J., Item No. 2891.

Primary Examiner—Joseph M. Golian
Attorney, Agent, or Firm—Arthur L. Liberman; Franklin D. Wolffe

[57] ABSTRACT

Process and compositions are described for the use in foodstuff flavor and aroma augmenting, modifying, enhancing and imparting compositions and as foodstuff aroma and flavor imparting materials of the mixture of 4-terpinenol propionate having the structure:

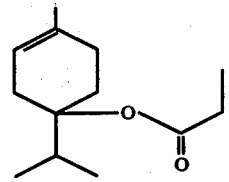

(which is produced by reacting 4-terpinenol with propionic anhydride in the presence of pyridine), and 2-methyl-3-furanthiol having the structure:

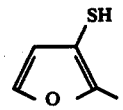

Addition of the mixture of 4-terpinenol propionate and 2-methyl-3-furanthiol to foodstuffs produces a roast beef aroma and flavor characteristic.

6 Claims, 4 Drawing Figures

FLAVORING WITH A MIXTURE OF 4-TERPINENOL PROPIONATE AND 2-METHYL-3-FURANTHIOL

BACKGROUND OF THE INVENTION

The present invention relates to mixtures of 4-terpinenol propionate and 2-methyl-3-furanthiol and novel compositions using such mixture of 4-terpinenol propionate and 2-methyl-3-furanthiol to alter, modify, augment or enhance the flavor and/or aroma of foodstuffs.

There has been considerable work performed relating to substances which can be used to impart (modify, augment or enhance) flavors to (or in) foodstuffs. These substances are used to diminish the use of natural materials, some of which may be in short supply and to provide more uniform properties in the finished product.

Roast beef aroma and flavor characteristics are particularly desirable for uses in many foodstuff flavors, particularly in proteinaceous food substances which have little or no flavor value such as dried fish meal and a number of soy protein products as well as misobean paste as described in Japanese Patent No. J78001840 of Jan. 28, 1978.

Arctander, "perfume and Flavor Chemicals," 1969, discloses at monograph #2891 the use in flavor formulations of alpha-terpinyl propionate having the structure:

as follows:

"para-Menth-1-en-8-yl propionate. For complete structure — see: Terpineol.

$C_{13}H_{22}O_2 = 210.32$

Colorless oily liquid.
Sp. Gr. 0.95 B.P. 240° C.
Practically insoluble in water, soluble in alcohol and oils.
Sweet-herbaceous, mildly fruity-piney, refreshing odor of moderate tenacity.
The title ester has acquired fame as a modifier for Lavender and Bergamot but it is really no match for Linalyl acetate or Ethyl linalyl acetate except that the Terpinyl propionate is very stable in alkaline media. It is therefore often used in soap, where its low cost is also appreciated.
For Pine variations, Citrus colognes, Lavender, Sage and other herbaceous fragrances, Fougeres, etc. it is a common ingredient when price puts a limit to the perfumer's creative activity.
The ester finds a little use in fruit complex flavor compositions, mainly in Citrus fruits, Lime, Spice (Cardamom) etc. The concentration will be about 1 to 10 ppm in the finished product.
G.R.A.S. F.E.M.A. No. 3053.

Prod.:

(1) from Terpineol and Propionic anhydride with a neutral diluent under reflux. Terpinyl propionate has also been used as the diluent.
(2) by azeotropic type esterification of Terpineol with Propionic acid.

Nothing in the Arctander reference implies the roast beef aroma and taste of the mixture of 4-terpinenol propionate and 2-methyl-3-furanthiol. The organoleptic profile of the mixture of 4-terpinenol propionate and 2-methyl-3-furanthiol is considered to be unexpected, unobvious and advantageous insofar as the flavoring of or flavor augmenting or enhancing of foodstuffs is concerned.

The organoleptic properties of 2-methyl-3-furanthiol taken alone, are set forth in U.S. Pat. No. 3,666,495, issued on May 30, 1972. However, the combination of 4-terpinenol propionate having the structure:

together with 2-methyl-3-furanthiol having the structure:

insofar as having supressed liver flavored and aroma characteristics and having roast beef-like flavor and aroma characteristics is considered to be unexpected, unobvious and advantageous.

THE INVENTION

It has now been discovered that novel solid and liquid foodstuff compositions and flavoring compositions therefor having roast beef aroma and flavor characteristics may be provided by the utilization of a mixture of 4-terpinenol propionate, a novel compound having the formula:

in admixture with 2-methyl-3-furanthiol having the structure:

4-Terpinenol propionate indicated as being useful, supra, may be produced, preferably by reacting 4-terpinenol with propionic anhydride in the presence of pyridine according to the following reaction:

In this reaction it is preferred that the propionic anhydride be in molar excess with respect to the 4-terpinenol. However, equimolar quantities of propionic anhydride and 4-terpinenol may be used. Preferably, however, the molar ratio of propionic anhydride: 4-terpinenol is about 3:1. The reaction is preferably carried out at reflux and the reflux temperature depends upon the particular solvent used.

The reaction time is a function of the reaction temperature used. When using refluxing pyridine as a reaction solvent, the reaction time varies from about 20 hours up to about 30 hours.

At the end of the reaction time the reaction mass is fractionally distilled yielding a product which is primarily 4-terpinenol propionate, but which also contains a small quantity (e.g., 5–15%) of alpha-terpinyl propionate having the structure:

When the 4-terpinenol propionate: 2-methyl-3-furanthiol mixture of our invention is used as a food flavor adjuvant the nature of the co-ingredients included with said mixture of 4-terpinenol propionate and 2-methyl-3-furanthiol in formulating the product composition will also serve to alter, modify, augment or enhance the organoleptic characteristics of the ultimate foodstuff treated therewith.

As used herein in regard to flavors, the terms "alter," "modify" and "augment" in their various forms mean "supplying or imparting flavor character or note to otherwise bland, relatively tasteless substances or augmenting the existing flavor characteristic where a natural flavor is deficient in some regard or supplementing the existing flavor impression to modify its quality, character or taste."

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not, have nutritional value. Thus, foodstuffs include soups, convenience foods, beverages, dairy products, candies, vegetables, cereals, soft drinks, snacks and the like.

Substances suitable for use herein as co-ingredients or flavoring adjuvants are well known in the art for such use, being extensively described in the relevant literature. It is a requirement that any such material be "ingestibly" acceptable and thus non-toxic and otherwise non-deleterious particularly from an organoleptic standpoint whereby the ultimate flavor and/or aroma of the consumable material used is not caused to have unacceptable aroma and taste nuances. Such materials may in general be characterized as flavoring adjuvants or vehicles comprising broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxy-anisole (mixture of 2- and 3-tertiary-butyl-4-hydroxy-anisole), butylated hydroxy toluene (2,6-di-tertiary-butyl-4-methyl phenol), propyl gallate and the like and sequestrants, e.g., citric acid.

Thickener compounds include carriers, binders, protective colloids, suspending agents, emulsifiers and the like, e.g., agar agar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins, and emulsifiers, e.g., mono- and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-3-pentenoic acid; ketones and aldehydes, e.g., acetaldehyde, acetophenone, acetone, acetyl methyl carbinol, acrolein, n-butanal, crotonal, diacetyl, 2-methyl butanal, beta, beta-dimethylacrolein, methyl-n-amyl ketone, n-hexenal, 2-hexenal, isopentanal, hydrocinnamic aldehyde, cis-3-hexenal, 2-heptanal, nonyl aldehyde, 4-(p-hydroxyphenyl)-2-butanone, alpha-ionone, beta-ionone, methyl-3-butanone, benzaldehyde, damascone, damascenone, acetophenone, 2-heptanone, o-hydroxyacetophenone, 2-methyl-2-hepten-6-one, 2-octanone, 2-undecanone, 3-phenyl-4-pentenal, 2-phenyl-2-hexenal, 2-phenyl-2-pentenal, furfural, 5-methyl furfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanal, 2-heptanol, trans-2-hexenol-1, cis-3-hexen-1-ol, 3-methyl-3-buten-1-ol, 1-pentanol, 1-penten-3-ol, p-hydroxyphenyl-2-ethanol, isoamyl alcohol, isofenchyl alcohol, phenyl-2-ethanol, alpha-terpineol, cis-terpineol hydrate, eugenol, linalool, 2-heptanol, acetoin; esters, such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate and terpenyl acetate; hydrocarbons such as dimethyl naphthalene, dodecane, methyl diphenyl, methyl naphthalene, myrcene, naphthalene, octadecane, tetradecane, tetramethyl naphthalene, tridecane, trimethyl naphthalene, undecane, caryophyllene, 1-phellandrene, p-cymene, 1-alpha-pinene, beta-pinene, dihydrocarveol; pyrazines such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl-2,3-dimethylpyrazine, 2-isoamyl-3,5,6-trimethylpyrazine, isopropyl dimethyl-pyrazine, methyl ethylpyrazine, tetramethylpyrazine, trimethyl-pyrazine; essential oils, such as jasmine absolute, cassia oil, cinnamon bark oil, black pepper oleoresin, oil of black pepper, rose absolute, orris absolute, oil of cubeb, oil of coriander, oil of pimento leaf, oil of patchouli, oil of nutmeg, lemon essential oil, safran oil, Bulgarian rose oil, capsicum, yara yara and vanilla; lactones such as -nonalactone; sulfides, e.g., methyl sulfide and bis(2-methyl-3-furyl)disulfide and other materials such as maltol, acetoin, acetals (e.g., 1,1-diethoxyethane, 1,1-dimethoxy-ethane and dimethoxymethane), piperine, chavicine, piperidine and reaction products such as the reaction products described in U.S. Pat. Nos. 3,394,015; 3,394,016; 3,394,017; 3,687,692; 3,782,973 and 4,045,587.

The specific flavoring adjuvant selected for use may be either solid or liquid depending upon the desired physical form of the ultimate product, i.e., foodstuff, whether simulated or natural, and should, in any event, (i) be organoleptically compatible with the 4-terpinenol propionate and 2-methyl-3-furanthiol of our invention by not covering or spoiling the organoleptic properties (aroma and/or taste) thereof; (ii) be nonreactive with the 4-terpinenol propionate and 2-methyl-3-furanthiol of our invention and (iii) be capable of providing an environment in which the 4-terpinenol propionate and 2-methyl-3-furanthiol can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff to which the flavor and/or aroma are to be imparted, modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of 4-terpinenol propionate and 2-methyl-3-furanthiol employed in a particular instance can vary over a relatively wide range, depending upon the desired organoleptic effects to be achieved. Thus, correspondingly, greater amounts would be necessary in those instances wherein the ultimate food composition to be flavored (e.g. with a spice flavor or a specific black pepper-like flavor) is relatively bland to the taste, whereas relatively minor quantities may suffice for purposes of enhancing the composition merely deficient in natural flavor or aroma. The primary requirement is that the amount selected to be effective, i.e., sufficient to alter, modify or enhance the organoleptic characteristics of the parent composition, whether foodstuff per se, chewing gum per se, medicinal product per se, toothpaste per se, or flavoring composition.

The use of insufficient quantities of 4-terpinenol propionate and 2-methyl-3-furanthiol will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of 4-terpinenol propionate and 2-methyl-3-furanthiol ranging from a small but effective amount, e.g., 0.05 parts per million up to about 100 parts per million based on total composition are suitable. Concentrations in excess of the maximum quantity stated are not normally recommended, since they fail to prove commensurate enhancement of organoleptic properties. In those instances, wherein the 4-terpinenol propionate and 2-methyl-3-furanthiol is added to the foodstuff as an integral component of a flavoring composition, it is, of course, essential that the total quantity of flavoring composition employed be sufficient to yield an effective 4-terpinenol propionate and 2-methyl-3-furanthiol concentration in the foodstuff product.

Food flavoring compositions prepared in accordance with the present invention preferably contain the 4-terpinenol propionate and 2-methyl-3-furanthiol in concentrations ranging from about 0.1% up to about 15% by weight based on the total weight of the said flavoring composition.

The composition described herein can be prepared according to conventional techniques well known as typified by cake batters and fruit drinks and can be formulated by merely admixing the involved ingredients within the proportions stated in a suitable blender to obtain the desired consistency, homogeneity of disperion, etc. Alternatively, flavoring compositions in the form of particulate solids can be conveniently prepared by mixing the 4-terpinenol propionate and 2-methyl-3-furanthiol with, for example, gum arabic, gum tragacanth, carrageenan and the like, and thereafter spray-drying the resultant mixture whereby to obtain the particular solid product. Pre-prepared flavor mixes in powder form, e.g., a fruit-flavored powder mix are obtained by mixing the dried solid components, e.g., starch, sugar and the like and 4-terpinenol propionate and 2-methyl-3-furanthiol in a dry blender until the requisite degree of uniformity is achieved.

It is presently preferred to combine with the 4-terpinenol propionate and 2-methyl-3-furanthiol of our invention, the following adjuvants:

Oil of Cubeb;
Phellandrene;
Oil of Coriander;
Oil of Pimento Leaf;
Oil of Patchouli;
Alpha Pinene;
Beta-Pinene;
Beta-Caryophyllene;
Dihydrocarveol;
Piperonal;
Piperine;
Oil of Black Pepper;
Black Pepper Oleoresin;
Capsicum;
Oil of Nutmeg;
Bis(2-methyl-3-furyl)disulfide;
Reaction products which produce meat flavors such as the reaction product of hydrogen sulfide and 2- or 5-monoalkyl and 2,5-dialkyl-4-hydroxy-2,3-dihydrofuran-3-ones;
The reaction product of hydrolyzed vegetable protein, cysteine and thiamine as described in U.S. Pat. No. 3,394,015.

The following Examples serve to illustrate the utility and process for preparing the 4-terpinenol propionate and 2-methyl-3-furanthiol of our invention. It will be understood that these Examples are illustrative and the invention is to be considered restricted thereto only as indicated in the appended claims.

All parts and percentages given herein are by weight unless otherwise specified.

EXAMPLE I

Preparation of 4-Terpinenol Propionate

Reaction:

To a 2 liter flask equipped with mechanical stirrer, Friedrich's condenser and heating mantle the following materials are added:

| | |
|---|---|
| 4-terpinenol | 154 grams (1 mole) |
| propionic anhydride | 390 grams (3 moles) |
| pyridine | 400 cc |

Figure 1:
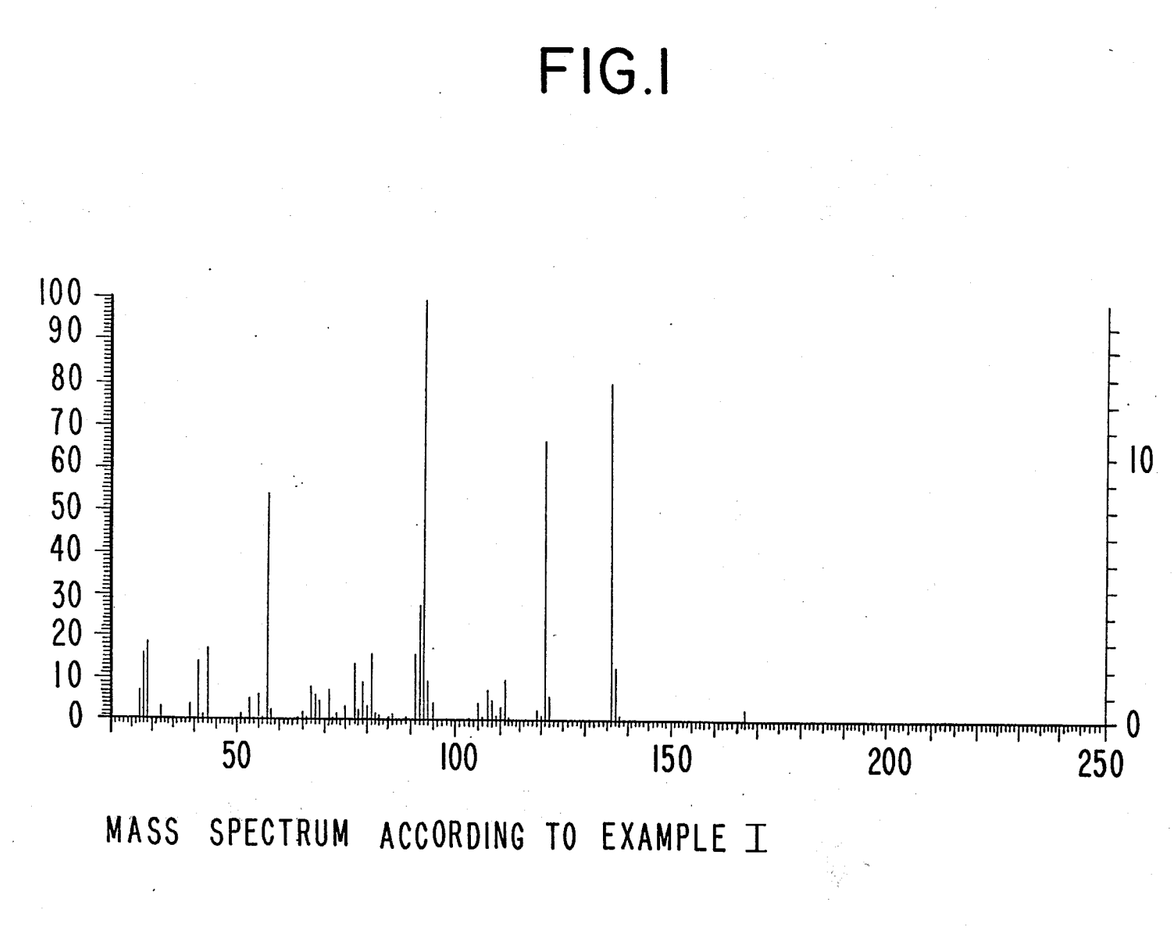
FIG. 1 sets forth the mass spectrum for the reaction product produced according to Example I.

The resulting mixture is heated to reflux for 28 hours, at which time GC indicates complete utilization of the alcohol reactant. A sample is analyzed via MS-GC in order to identify the reaction products. The mass spectrum is set forth in FIG. 1. The GC-MS profile confirms that the title compound, 4-terpinenol propionate along with a small amount of alpha-terpinyl propionate, is present.

4-Terpinenol propionate is purified by means of vacuum distillation from the reaction mixture. The reaction mass is added to a 2 liter reaction flask together with Primol ®. Primol is a registered trademark identifying a hydrocarbon mineral oil produced by Exxon Incorporated of Linden, N.J. The fractionation is carried out yielding 8 fractions as follows:

| | | | | Purity | |
|---|---|---|---|---|---|
| Fraction Number | Vapor Temperature (° C) | Liquid Temperature (° C) | Vacuum mm Hg | 4-Terpinenol Propionate | Alpha Terpinyl Propionate |
| 1 | 25–50 | 25–30 | 10 | — | |
| 2 | 64 | 74 | 10 | — | |
| 3 | 64 | 74 | 10 | — | |
| 4 | 64–90 | 87 | 10 | — | |
| 5 | 90 | 137 | 10 | 84.727 | 4.900% |
| 6 | 110 | 137 | 10 | 86.471 | 6.269% |
| 7 | 110 | 137 | 10 | 93.385 | 3.284% |

-continued

| | | | | Purity | |
|---|---|---|---|---|---|
| Fraction Number | Vapor Temperature (° C) | Liquid Temperature (° C) | Vacuum mm Hg | 4-Terpinenol Propionate | Alpha Terpinyl Propionate |
| 8 | 108 | 137 | 10 | — | — |

Figure 2:
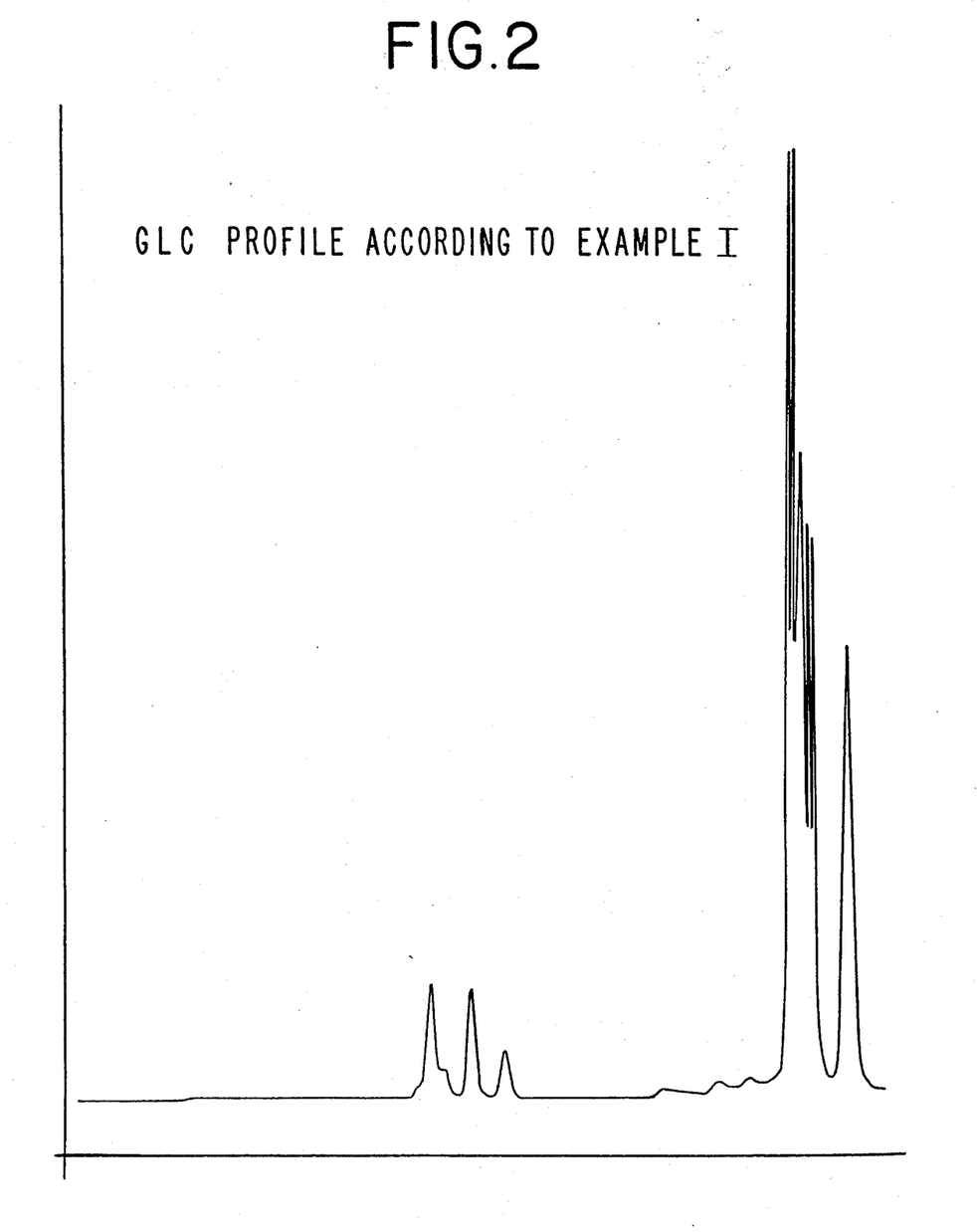
FIG. 2 is the GC profile for distilled 4-terpinenol propionate produced according to Example I.

Fractions 5, 6 and 7 are placed in a 250 ml reaction flask and the lower boiling impurities are further removed by vacuum distillation leaving behind 35.83 grams of 90.83% 4-terpinenol propionate and 6.33% alpha-terpinyl propionate. The GC profile of distilled 4-terpinenol propionate is set forth in FIG. 2.

A sample of the reaction mass is then spiked with pyridine which shows that none of the impurities remaining in the 35.83 grams is pyridine. A trap of 4-terpinenol propionate free of alpha-terpinyl propionate is also evaluated along with the above mixture of alpha-terpinyl propionate and 4-terpinenol propionate.

The 4-terpinenol propionate structure, to wit:

is confirmed using NMR and IR analyses.

Figure 3:
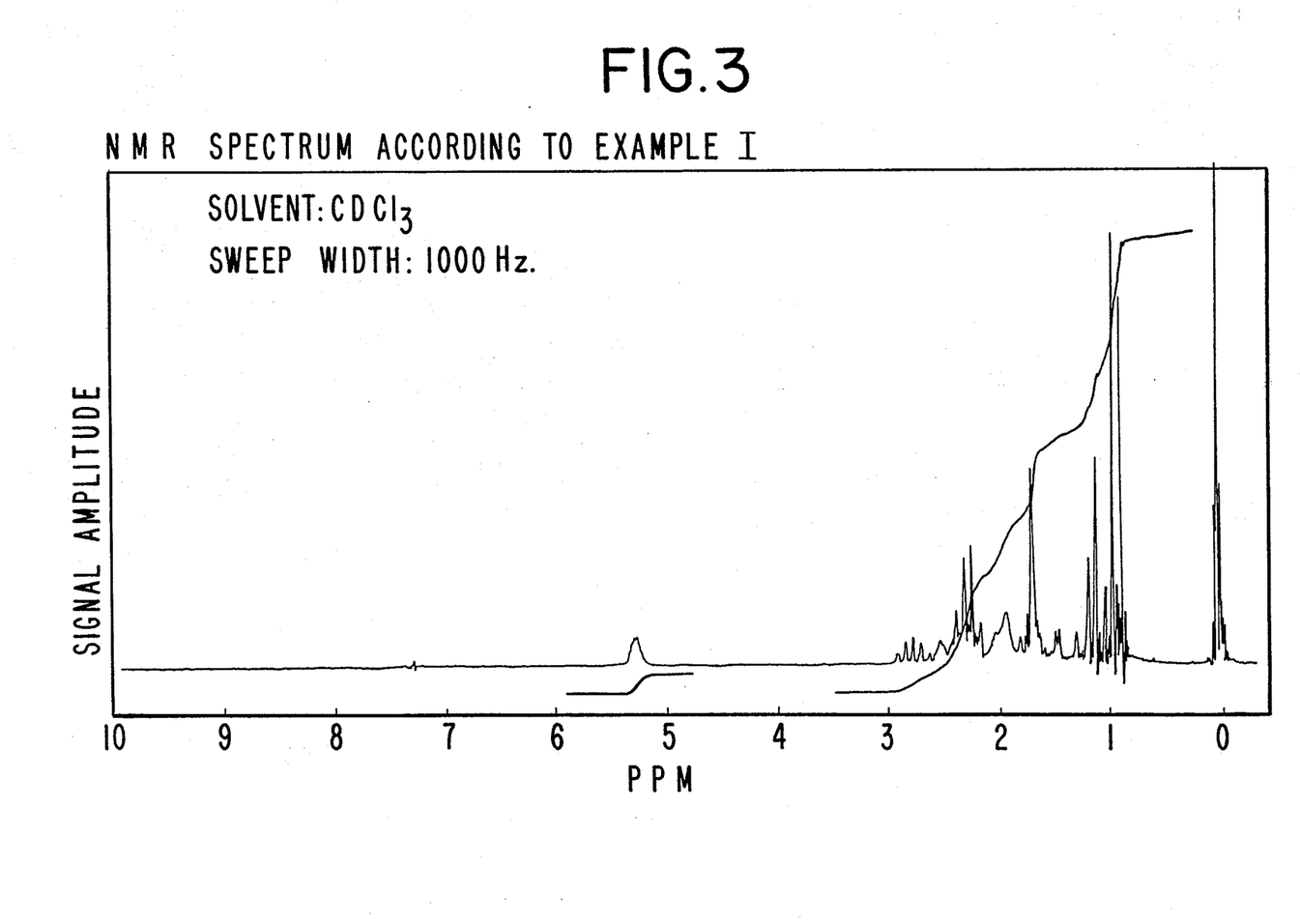
FIG. 3 is the NMR spectrum for 4-terpinenol propionate produced according to Example I.
Figure 4:
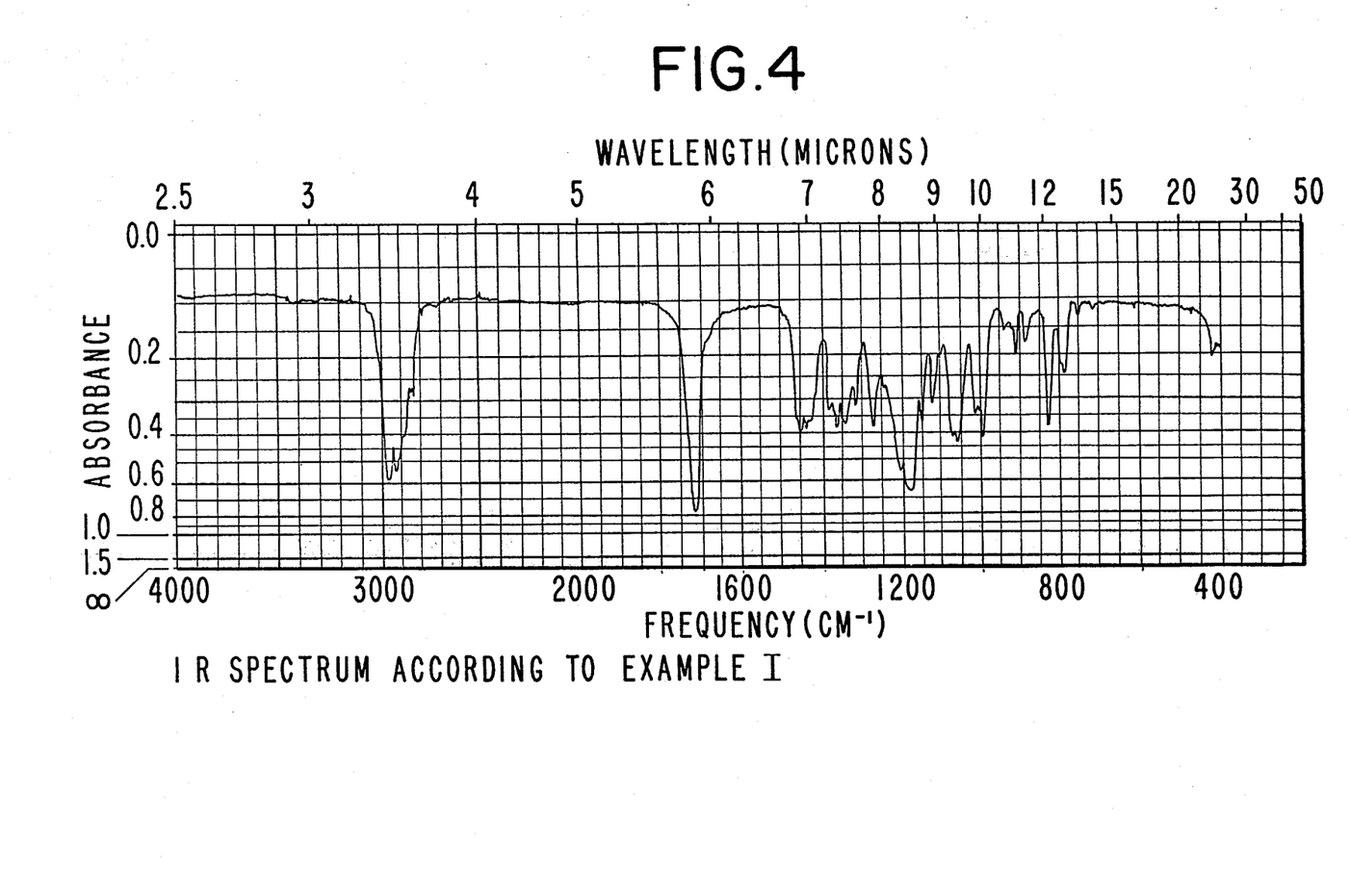
FIG. 4 is the IR spectrum for 4-terpinenol propionate produced according to Example I.

The NMR spectrum is set forth in FIG. 3. The IR spectrum is set forth in FIG. 4. The resulting product has a black pepper, woody and oriental aroma characteristic and black pepper, woody, oriental and biting flavor characteristics in admixture with the alpha-terpinyl propionate and as pure 4-terpinenol propionate.

EXAMPLE II

The following test compounds are compared, taken alone or taken further together with 2-methyl-3-furanthiol having the structure:

4-Terpinenol having the structure:

Alpha Terpinenol having the structure:

4-Terpinenol Propionate having the structure:

Each of the test compounds taken alone or taken further together with 2-methyl-3-furanthiol is diluted in food grade ethanol to a concentration of 1%. The resulting test solutions are then diluted in water at various concentrations, 0.1 ppm, 0.5 ppm, 1 ppm and 5 ppm. Each of the test solutions is then tasted and smelled.

The test compounds taken alone and taken further together with 2-methyl-3-furanthiol are tasted and smelled as follows:

| | Solution | Evaluation |
|---|---|---|
| (A) | 2-Methyl-3-Furanthiol at 0.1 ppm | At 0.1 ppm, a beef extract, Hydrolyzed vegetable protein-like, dominating liver character with sulfury and slightly gluey aroma and taste characteristics. |
| (B) | 4-Terpineol Propionate and the combination of 4-Terpineol Propionate and 2-Methyl-3-Furanthiol | 4-Terpineol Propionate taken alone, at 1 ppm, has a piney, balsamic, herbaceous, resin-like, citrus undertone insofar as its aroma and taste is concerned. At the rate of 0.1 ppm of 4-Terpineol Propionate: 0.1 ppm of 2-Methyl-3-Furanthiol it is admixed and a roast beef character is added to the 2-Methyl-3-Furanthiol and the liver notes are depressed. |
| (C) | Alpha Terpineol taken alone and taken in combination with 2-Methyl-3-Furanthiol | Alpha Terpineol, taken alone, has a piney, earthy and musty aroma and taste at 1 ppm. At 5 ppm it has a sweet, piney, citrus, nutmeg aroma and taste but a celluloid-like aftertaste. 0.2 ppm of Alpha Terpineol combined with 0.1 ppm of 2-Methyl-3-Furanthiol gives rise to a musty/earthy character being added to the taste of 2-Methyl-3-Furanthiol and such addition is not valuable for flavor use in foodstuffs. |
| (D) | 4-Terpineol taken alone or taken together with 2-Methyl-3-Furanthiol | At 0.2 ppm 4-Terpineol taken alone has a herbaceous, lime aroma and taste; at 1 ppm 4-Terpineol taken alone has a herbaceous, sweet peppery, earthy mushroom aroma and taste. At the rate of 0.5 ppm of 2-Methyl-3-Furanthiol: 1 ppm of |

| Solution | Evaluation |
|---|---|
| | 4-Terpineol the combination has an oniony character being added to the basic taste of 2-Methyl-3-Furanthiol. |

Each of 4-Terpineol Propionate, alpha Terpineol and 4-Terpineol affect 2-Methyl-3-Furanthiol differently, in kind, insofar as the organoleptic characteristics of the resulting combinations concerned. The 4-Terpineol Propionate has the most interesting organoleptic effect as a result of the incorporation into the 2-Methyl-3-Furanthiol of a "roast beef" character and this effect is unexpected, unobvious and advantageous.

EXAMPLE III

A 1:1 mixture of 4-terpinenol propionate (prepared according to Example I) and 2-methyl-3-furanthiol is dissolved in propylene glycol in amount sufficient to give a propylene glycol solution containing 0.1 percent by weight of said mixture. 0.9 cc of this solution is added to 7.3 gm of a soup base consisting of:

| Ingredient | Quantity (Parts/100 total) |
|---|---|
| Fine ground sodium chloride | 35.62 |
| Hydrolyzed vegetable protein (4 BE: Nestle's) | 27.40 |
| Monosodium glutamate | 17.81 |
| Sucrose | 10.96 |
| Beef Fat | 5.48 |
| Sethness caramel color (powder B & C) | 2.73 |

The resulting mixture is added to 12 ozs. of boiling water to create a soup having an excellent roast beef flavor.

EXAMPLE IV

A 1:2 mixture of 4-terpinenol propionate: 2-methyl-3-furanthiol is added to a 2 percent solution of Wyler's "Beef Flavored Instant Bouillon" (manufactured by Wyler Foods, Division of Borden, Inc., Chicago, Ill., U.S.A.).
(Ingredients: salt, hydrolyzed vegetable protein, malto dextrin, sugar, beef fat, water, monosodium glutamate, flavorings, corn sugar, beef extract, caramel color, hydrogenated vegetable fat, U.S. certified food color).
at the rate of 2 ppm. The resulting beef broth flavor has an intense and pleasant roast beef character.

EXAMPLE V 0.5 grams of a 1:1 mixture of 4-terpinenol propionate: 2-methyl-3-furanthiol is emulsified in a solution containing the following materials:

100 grams gum arabic
100 grams water
0.5 grams of 20 percent solution in ethanol of butylated hydroxy anisole.

The resultant emulsion is spray-dried in a Bowen Lab. Model spray-drier, inlet temperature 500° F., outlet temperature 200° F. 12 grams of this spray-dried material is mixed with 29.2 grams of the soup base set forth in Example III. The resulting mixture is then added to 12 ozs. of boiling water, and an excellent roast beef flavored soup is obtained.

EXAMPLE VI

330 Grams of gelatin is dissolved at 40° C. in 8,250 grams of deionized water to form a "gelatin solution." 600 cc of 5 percent acetic acid is then added.

330 Grams of spray-dried gum arabic is dissolved at room temperature in 8,250 grams of deionized water to form a "gum arabic solution."

The gum arabic solution is placed in a 30 liter vessel and 2.5 liters of the gelatin solution is added. The temperature of the mixture is adjusted to 37° to 40° C. Through a tube beneath the surface of the gum arabic solution, 4,000 grams of 0.1 percent (by weight) solution of a 1:2 mixture of 4-terpinenol propionate: 2-methyl-3-furanthiol in propylene glycol is added over a period of approximately 30 minutes.

The mixture is agitated at 37° to 40° C. until an average droplet size of 25 microns is obtained. The remaining gelatin solution (6 liters) is then added. The pH of the solution is then adjusted to 4.5 to 4.6 with a 10 percent sodium hydroxide solution.

After the 25 micron droplet size is achieved, the temperature is allowed to drop to 25° C. over a period of approximately 25 hours while maintaining the pH at 4.5 to 4.6.

The capsule slurry is then stirred and cooled to 5° C. and is maintained at 5° C. with stirring, for at least 2.5 hours. The slurry is then spray-dried.

The capsules thus formed are filtered and mixed with the soup base of Example III in the weight ratio of 1:6. 20 grams of the resulting capsule soup base mixture is then added to 30 ozs. of boiling water thereby creating a soup having an excellent roast beef flavor.

What is claimed is:

1. A mixture of 4-terpinenol propionate having the structure:

and 2-methyl-3-furanthiol having the structure:

wherein the ratio of 4-terpinenol propionate: 2-methyl-3-furanthiol is 1:1 up to 1:2.

2. The mixture of claim 1 wherein the ratio of 4-terpinenol propionate:2-methyl-3-furanthiol is 1:1.

3. A roast beef flavor modifying composition comprising from about 0.1% up to about 15% by weight based on the total weight of said flavoring composition of the composition defined according to claim 1 and the remainder of said composition being at least one adjuvant selected from the group consisting of:
   Oil of Cubeb;
   Phellandrene;
   Oil of Coriander;

Oil of Pimento Leaf;
Oil of Patchouli;
Alpha Pinene
Beta-Pinene
Beta-Caryophyllene;
Dihydrocarveol;
Piperonal;
Piperine;
Oil of Black Pepper;
Black Pepper Oleoresin;
Capsicum;
Oil of Nutmeg;
Bis(2-methyl-3-furyl)disulfide;
the reaction product of hydrogen sulfide and 2- or 5-monoalkyl or 2,5-dialkyl-4-hydroxy-2,3-dihydrofuran-3-ones;
the reaction product of hydrolyzed vegetable protein, cysteine and thiamine.

4. A roast beef flavor modifying composition comprising from about 0.1% up to about 15% by weight based on the total weight of said flavoring composition of the composition defined according to claim 2 and the remainder of said composition being at least one adjuvant selected from the group consisting of:
Oil of Cubeb;
Phellandrene;
Oil of Coriander;
Oil of Pimento Leaf;
Oil of Patchouli;
Alpha Pinene;
Beta-Pinene;
Beta-Caryophyllene;
Dihydrocarveol;
Piperonal;
Piperine;
Oil of Black Pepper;
Black Pepper Oleoresin;
Capsicum;
Oil of Nutmeg;
Bis(2-methyl-3-furyl)disulfide;
the reaction product of hydrogen sulfide and 2- or 5-monoalkyl or 2,5-dialkyl-4-hydroxy-2,3-dihydrofuran-3-ones;
the reaction product of hydrolyzed vegetable protein, cysteine and thiamine.

5. A process for augmenting or enhancing the roast beef flavor or aroma of a foodstuff comprising the step of adding thereto from 0.05 ppm up to about 100 ppm based on total composition of the composition defined according to claim 1.

6. A process for augmenting or enhancing the roast beef flavor or aroma of a foodstuff comprising the step of adding thereto from 0.05 ppm up to about 100 ppm based on total composition of the composition defined according to claim 2.